(12) United States Patent
Chia

(10) Patent No.: US 11,518,940 B2
(45) Date of Patent: Dec. 6, 2022

(54) PLASTIC RECYCLING SYSTEM AND METHOD THEREOF

(71) Applicant: Viro Group Inc., Walnut, CA (US)

(72) Inventor: Soon Chia, Walnut, CA (US)

(73) Assignee: Viro Group Inc., Walnut, CA (US)

( * ) Notice: Subject to any disclaimer, the term of this patent is extended or adjusted under 35 U.S.C. 154(b) by 0 days.

(21) Appl. No.: 16/796,907

(22) Filed: Feb. 20, 2020

(65) Prior Publication Data

US 2021/0261866 A1 Aug. 26, 2021

(51) Int. Cl.
| C10B 19/00 | (2006.01) |
| C10B 53/07 | (2006.01) |
| C10B 27/06 | (2006.01) |
| C10L 3/08 | (2006.01) |

(52) U.S. Cl.
CPC .............. *C10B 19/00* (2013.01); *C10B 27/06* (2013.01); *C10B 53/07* (2013.01); *C10L 3/08* (2013.01); *C10L 2200/0469* (2013.01); *C10L 2290/02* (2013.01); *C10L 2290/04* (2013.01); *C10L 2290/06* (2013.01)

(58) Field of Classification Search
CPC . C10B 19/00; C10B 27/06; C10L 3/08; C10L 2290/02; C10L 2290/04; C10L 2290/06
See application file for complete search history.

(56) References Cited

U.S. PATENT DOCUMENTS

| 4,208,252 | A | * | 6/1980 | Yoshida | C10B 47/44 201/2.5 |
| 5,824,193 | A | * | 10/1998 | Edwards | C10B 47/34 201/7 |
| 7,758,729 | B1 | * | 7/2010 | DeWhitt | C10B 53/07 202/87 |
| 7,922,871 | B2 | * | 4/2011 | Price | F27B 9/045 201/36 |
| 8,193,403 | B2 | * | 6/2012 | DeWhitt | C10G 1/10 585/241 |
| 8,581,015 | B2 | * | 11/2013 | Jeon | C10G 1/10 585/241 |
| 9,145,520 | B2 | * | 9/2015 | DeWhitt | C10G 1/10 |
| 10,131,847 | B2 | * | 11/2018 | McNamara | F23G 7/12 |
| 10,538,708 | B2 | * | 1/2020 | Boonsawat | C10B 57/18 |
| 11,162,030 | B2 | * | 11/2021 | Erasmus | C10B 57/005 |
| 11,168,259 | B2 | * | 11/2021 | Drennan | C10B 47/44 |
| 2002/0072640 | A1 | * | 6/2002 | Nichols | C10B 53/00 585/241 |
| 2003/0050519 | A1 | * | 3/2003 | Cheng | C10B 47/06 585/241 |
| 2018/0142164 | A1 | * | 5/2018 | Boonsawat | C10G 1/10 |
| 2019/0275486 | A1 | * | 9/2019 | Peltekis | C10G 1/10 |

* cited by examiner

*Primary Examiner* — Jonathan Miller
(74) *Attorney, Agent, or Firm* — Raymond Y. Chan; David and Raymond Patent Firm

(57) ABSTRACT

A plastic recycling system and method thereof is provided, wherein one or more plastic products are contained in a reaction unit and heated by an electric heating unit which converts electrical energy into thermal energy. The one or more plastic products in the reaction unit are decomposed to produce one or more decomposed product in gas phase through a decomposition reaction, such as pyrolysis reaction, to form one or more gaseous fuel products which are condensed into one or more liquid phase fuel products by a condensation unit.

13 Claims, 4 Drawing Sheets

PLASTIC RECYCLING SYSTEM AND METHOD THEREOF

BACKGROUND OF THE PRESENT INVENTION

Field of Invention

The present invention relates to recycling treatment, and more particularly to plastic recycling system and method thereof.

Description of Related Arts

Plastic products are widely used in daily life, but how to deal with the plastic waste afterwards is a difficult problem. The traditional methods include landfill, incineration and recycled granulation. Plastic waste is buried underground and expected to be naturally degraded after hundreds of year. This is apparently not an appropriate way to treat plastic waste.

As stated above, there are three traditional methods of treating plastic waste, including landfill, incineration and recycled granulation. Landfill is a treatment that plastic waste is buried underground and expected to be naturally degraded after hundreds of years. In fact, plastic waste is hardly to be degraded in the natural environment but will merely become micro particles spreading everywhere that causes a secondary pollution to the environment. Incineration is a treatment to directly combust the plastic containing mainly compositions of hydrocarbons. However, during the combustion process, plastic will release a large amount of harmful substances, such as dioxin. Recycled granulation refers to the crushing of the plastic waste into particles by means of mechanical process and then re-making such particles into recycling plastic products. However, the application scope of such recycled granulation is limited, wherein high-quality plastic products can be processed recycled granulation to produce poor quality recycling plastic products, while poor-quality plastic products are difficult to process recycled granulation.

In addition, there is another common way of plastic recycling treatment by means of pyrolysis, i.e. decomposition brought about by high temperatures, to decompose plastic formed by the polymerization of multiple molecules into small molecular hydrocarbon compounds. Specifically speaking, the plastic wastes are contained in a reaction container and thermal energy is provided to heat the reaction container, wherein petroleum or natural gas is generally used as fuel to provide heat at the bottom of the reaction container, so that the plastic wastes in the reaction container are melted and then gasified and pyrolyzed into a variety of small hydrocarbon compounds. During such pyrolysis process, the temperature and pressure of the reaction container are required to be accurately controlled, wherein either the temperature of the reaction container is too high or too low will adversely affect the reacting plastic and the efficiency of the whole process. However, it is apparent that the control of the supplying heat through fuel combustion is relatively difficult and oxygen in the air is required in the fuel combustion process, that spontaneously gathers oxygen in the air around the reaction container. Therefore, once any of the hydrocarbon products in the reaction container under high temperature leaks out, it is easy to trigger an explosion.

In order to ensure the heat generated at the bottom portion of the reaction container can be transferred to the entire reaction container and, at the same time, to avoid any contact of the reactants in the reaction container with outside air, the reaction container must be remained in a sealed condition during the pyrolysis process until the reaction is completed. During the gasification process, the pressure in the entire reaction container will be increased sharply and the operator outside the reaction container is unable to directly observe the progress of the reaction inside the reaction container, so the reaction time is generally extended to ensure a complete reaction. In other words, the conventional plastic recycling method by pyrolysis is not only dangerous in safety concern but also difficult to be safely controlled, resulting in relatively low operation efficiency.

SUMMARY OF THE PRESENT INVENTION

The invention is advantageous in that it provides a plastic recycling system and method thereof adapted for thermal decomposition process, such as pyrolysis, for plastic material while it can be precisely controlled throughout the process.

Another advantage of the invention is to provide a plastic recycling system and method thereof, which can provide a more safe and reliable environment for thermal decomposition and pyrolysis of plastic.

Another advantage of the invention is to provide a plastic recycling system and method thereof, wherein the temperature of both the plastic gasification environment and plastic pyrolysis environment can be more precisely controlled, so that the expected product(s) can be obtained.

Another advantage of the invention is to provide a plastic recycling system and method thereof, wherein the reaction temperature of the different positions in a reaction unit can be more precisely controlled so as to obtain predetermined end product(s), wherein the reaction unit has a lower space portion adapted for plastic gasification and an upper space portion adapted for plastic pyrolysis.

Another advantage of the invention is to provide a plastic recycling system and method thereof, which do not require any fuel and oxygen in air to process combustion for producing heat to the reaction unit of the plastic recycling system, so that the plastic recycling system of the present invention will not gather oxygen in air there and generate carbon dioxide resulted in fuel combustion.

Another advantage of the invention is to provide a plastic recycling system and method thereof, which includes a reaction unit having a lower space portion adapted for plastic gasification and an upper space portion adapted for plastic pyrolysis, wherein the producing of heat for the upper space portion and the lower space portion can be controlled independently.

Another advantage of the invention is to provide a plastic recycling system and method thereof, which includes a reaction unit having a lower space portion adapted for plastic gasification and an upper space portion adapted for plastic pyrolysis, wherein the heat applied to the upper space portion and the lower space portion can be produced independently.

Another advantage of the invention is to provide a plastic recycling system and method thereof, wherein a heating unit that converts electricity into heat to produce thermal energy is provided to heat the reaction unit, wherein the heating unit can be arranged around the reaction unit upon predetermined demands instead of being limited to heat the bottom portion of the heating unit as in the conventional fuel combustion method.

Another advantage of the invention is to provide a plastic recycling system and method thereof, wherein each of plastic gasification environment and the plastic pyrolysis environment can be arranged with the heating unit independently, so that the reaction unit does not need to rely on traditional fuel combustion method that uses air convection to transmit heat, and thus the sealing requirement for the reaction unit can be reduced.

In accordance with another aspect of the invention, the present invention provides a plastic recycling method comprising the following steps:

(a) heating plastic waste in a reaction unit by at least one heating unit that converts electricity into heat to thermally decompose the plastic waste to produce at least a decomposed product, including fuel in gas phase, and (b) condensing the gas phase decomposed product to useable liquid phase fuel product.

In one embodiment, the step (a) further comprises the steps of heating the reaction unit with a gasification heating module to gasify the plastic in the reaction unit to gasified plastic, and then heating the gasified plastic by a decomposition heating module to decompose and split the gasified plastic in the reaction unit.

In one embodiment, the step (a) further comprises a step of transmitting or delivering the gasified plastic from a gasification module of the reaction unit to a decomposition module of the reaction unit for decomposition such as pyrolysis by operationally connecting the gasification module with the decomposition module In one embodiment, in the step (a), the gasification module is heated to the predetermined temperature by the gasification heating module of the heating unit and the decomposition module is heated to the predetermined temperature by the decomposition heating module of the heating unit.

In one embodiment, in the step (a), when the temperature of the decomposed product before leaving the decomposition module is lower than the predetermined temperature, the decomposed product is kept in or transmitted back to the decomposition module in order to continue to be heated to reach the predetermined temperature.

In one embodiment, in the step (a), the plastic contained at the lower portion of the reaction unit is heated by the heating unit arranged around the lower portion of the reaction unit and gasified to flow upwardly to the upper portion of the reaction unit for decomposition such as pyrolysis.

In one embodiment, the plastic recycling method further comprises the following steps after the step (a) and before the step (b):

(i) filtering the decomposed product by a filtration unit, and (ii) transmitting the filtered decomposed product to a condensation unit for processing the condensing step (b).

In one embodiment, the plastic recycling method further comprises the following steps after the step (b):

collecting the liquid phase fuel product, delivering a portion of the liquid phase fuel product to an electric power generation unit to generate electricity supplying the heating unit, wherein the electric power generation unit is electrically connected to the heating unit.

In one embodiment, in the step (a), wherein the decomposition module of the reaction unit is heated and controlled at the predetermined temperature ranged from 80° C. to 120° C. for plastic pyrolysis and decomposition.

In one embodiment, in the step (a), the gasification module of the reaction unit is heated and controlled at the predetermined temperature ranged from 380° C. to 440° C. for plastic gasification.

In accordance with another aspect of the invention, the present invention provides a plastic recycling system arranged for plastic recycling, which comprises:

at least a heating unit;

at least a reaction unit, wherein the heating unit is arranged to provide thermal energy to the reaction unit to heat the plastic disposed in the reaction unit by the thermal energy provided by the heating unit which converts electricity to the thermal energy, wherein the plastic is heated by the heating unit to be pyrolyzed to produce at least a decomposed product in the reaction unit, wherein the decomposed product includes a gas phase fuel product; and a condensation unit which is operationally connected with the reaction unit, wherein the condensation unit converts at least a portion of the decompose product from the reaction unit into a liquid phase fuel product.

In one embodiment, the plastic recycling system further comprises a filtration unit which is operationally connected with the condensation unit for filtering the decomposed product.

In one embodiment, the heating unit is arranged at a bottom portion of the reaction unit to supply heat thereto, wherein, initially, the plastic is disposed in a lower space portion of a sealable reaction chamber of the reaction unit, so that when the plastic disposed in the lower space portion of the reaction chamber of the reaction unit is heated to a predetermined temperature, the plastic is gasified and flows towards an upper portion of the reaction unit where the gasified plastic is decomposed to obtain the decomposed product in gas phase.

In one embodiment, the heating unit comprises a gasification heating module and a decomposition heating module, wherein the gasification heating module is arranged to provide heat to at least a first portion of the reaction unit to gasify the plastic contained in the reaction unit, and that the decomposition heating module is arranged to provide heat to at least a second portion of the reaction unit to decompose the gasified plastic.

In one embodiment, the reaction unit comprises a gasification module and a decomposition module operationally connected with the gasification module, wherein after the plastic contained in the gasification module is gasified, the gasified plastic is transmitted to the decomposition module wherein the gasified plastic is decomposed to obtain the decomposed product in gas phase.

In one embodiment, the heating unit comprises a gasification heating module and a decomposition heating module, wherein the gasification heating module is arranged to provide heat to gasify the plastic contained in the gasification module, and the decomposition heating module is arranged to provide heat to decomposed the gasified plastic in the decomposition module, wherein the gasification heating module and the decomposition heating module are independently controlled.

In one embodiment, the decomposition module is positioned on top of the gasification module to form a sealable reaction chamber of the reaction unit in combination, wherein an inner space in the gasification module forms the upper space portion of the reaction chamber and an inner space in the decomposition module forms the lower space portion of the reaction chamber, wherein the plastic gasified in the gasification module flows upwardly to the decomposition module for decomposition process such as pyrolysis.

In one embodiment, the gasification module and the decomposition module of the reaction unit are connected through at least one transmission channel, wherein the gasified products obtained in the gasification module is transmitted to the decomposition module through the at least one transmission channel.

In one embodiment, the decomposition module has a sealable decomposing reaction chamber and at least one circulation channel, wherein an inlet of decomposing reaction chamber is operatively linked to a circulation outlet passage of the at least one circulation channel, and an outlet of decomposing reaction chamber is operatively linked to a circulation inlet passage of the at least one circulation channel, wherein when a temperature of the gasified decomposed product that is going to emit through the outlet of the at least one circulation channel and deliver to the condensation unit is lower than the predetermined temperature, the outlet of decomposing reaction chamber used to be connected to the condensation unit is reconnect to the circulation inlet passage of the at least one circulation channel, such that the gasified decomposed product is directed to transmit through the at least one circulation channel and back to the decomposing reaction chamber for further heating.

In one embodiment, the plastic recycling system further comprises an electric power generation unit which is electrically connected with the heating unit for electrically power supply and is operationally connected with the condensation unit, wherein at least a portion of the decomposed product in the condensation unit is recycled to the electric power generation unit for combustion to produce electricity supplying to the heating unit for producing heat energy.

DETAILED DESCRIPTION OF THE PREFERRED EMBODIMENT

Figure 1:
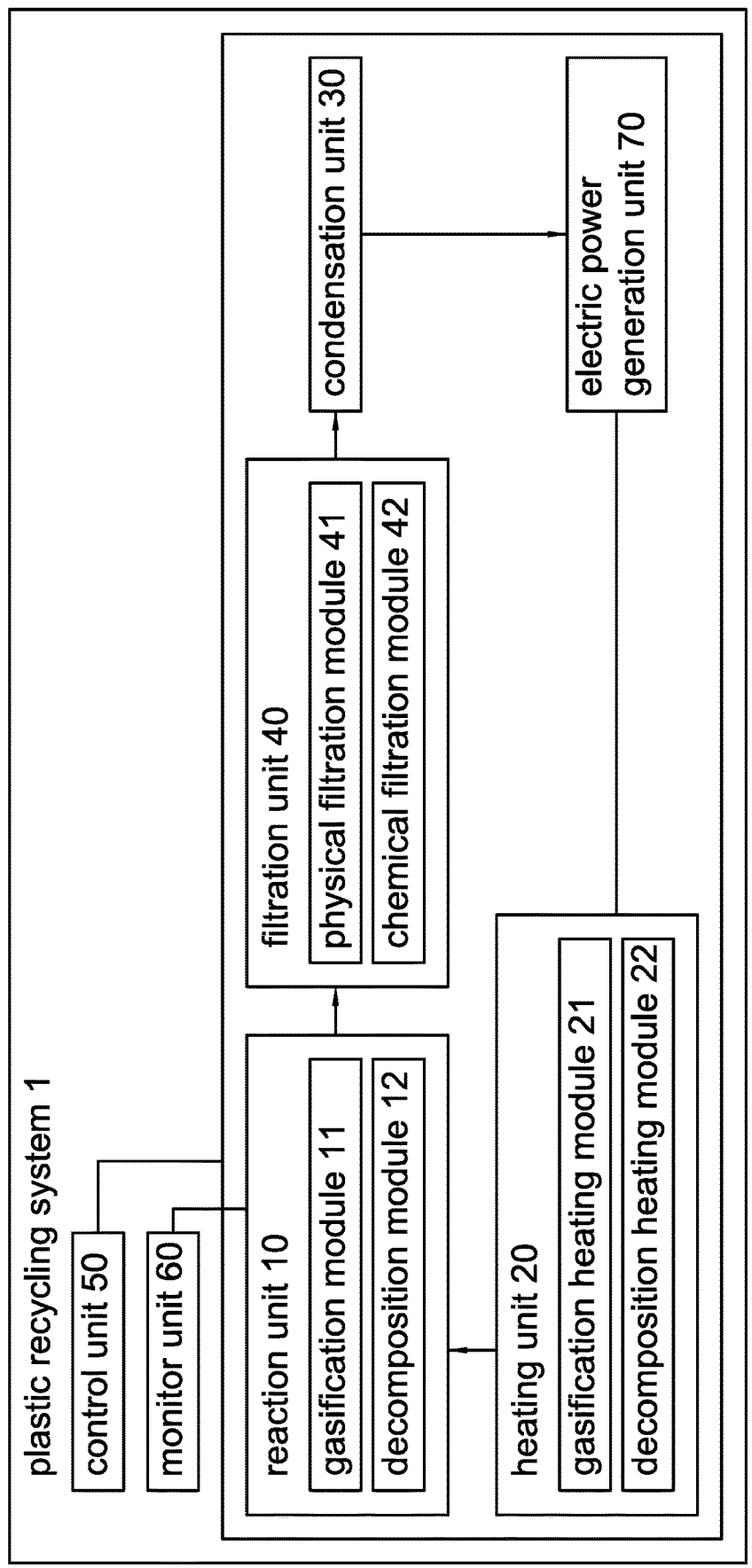
FIG. 1 is a schematic view illustrating a plastic recycling system according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that in the disclosure of the present invention, the terms "vertical", "horizontal", "up", "down", "front", "rear", "left", "right", The orientations or positional relationships indicated by "vertical", "horizontal", top," "bottom", "inner", "outer" and the like are based on the orientations or positional relationships shown in the drawings, which are merely for the convenience of describing the present invention and simplification of the description, rather than indicating or implying that the device or element should be located in specific orientation or should be constructed and operated in a specific orientation. In this way, the above terms of description should not be construed as limitations on the invention.

The present invention provides a plastic recycling system 1 and method thereof, which can be used to recycle plastic products, such as plastic waste like plastic bag, bottle, cup, straw, container, and etc., which is recycled and converted into one or more useable fuel products, such as and etc., so that the plastic waste can be recycled for reuse. There are many different kinds of plastic product, such as PETE $(C_{10}H_8O_4)_n$, HDPE $(C_2H_4)_n$, PVC $(C_2H_4Cl)_n$), LDPE $((C_2H_4)_n$, PP $(C_3H_6)_n$, PS $(C_8H_8)_n$. However, when the various plastic products become plastic wastes that will generally be mixed together. The plastic recycling system of the present invention is able to uniformly recycle such mixed plastic products. In other words, the users have no need to presort and separate the mixed plastic waste but may recycle them all together by means of the plastic recycling system and method of the present invention, that would be very convenient for the users.

Since heat energy is the essential energy to be used in the decomposing and pyrolyzing process for recycling plastic, the plastic recycling system 1 of the present invention is newly designed and arranged to be capable of using electrical energy which is converted into heat energy for the decomposition and pyrolysis process. Accordingly, during the decomposition and pyrolysis process of plastic, the heat energy to be applied is possible to be precisely control to ensure the safety and reliability of the entire decomposition and pyrolysis reaction.

Figure 2:
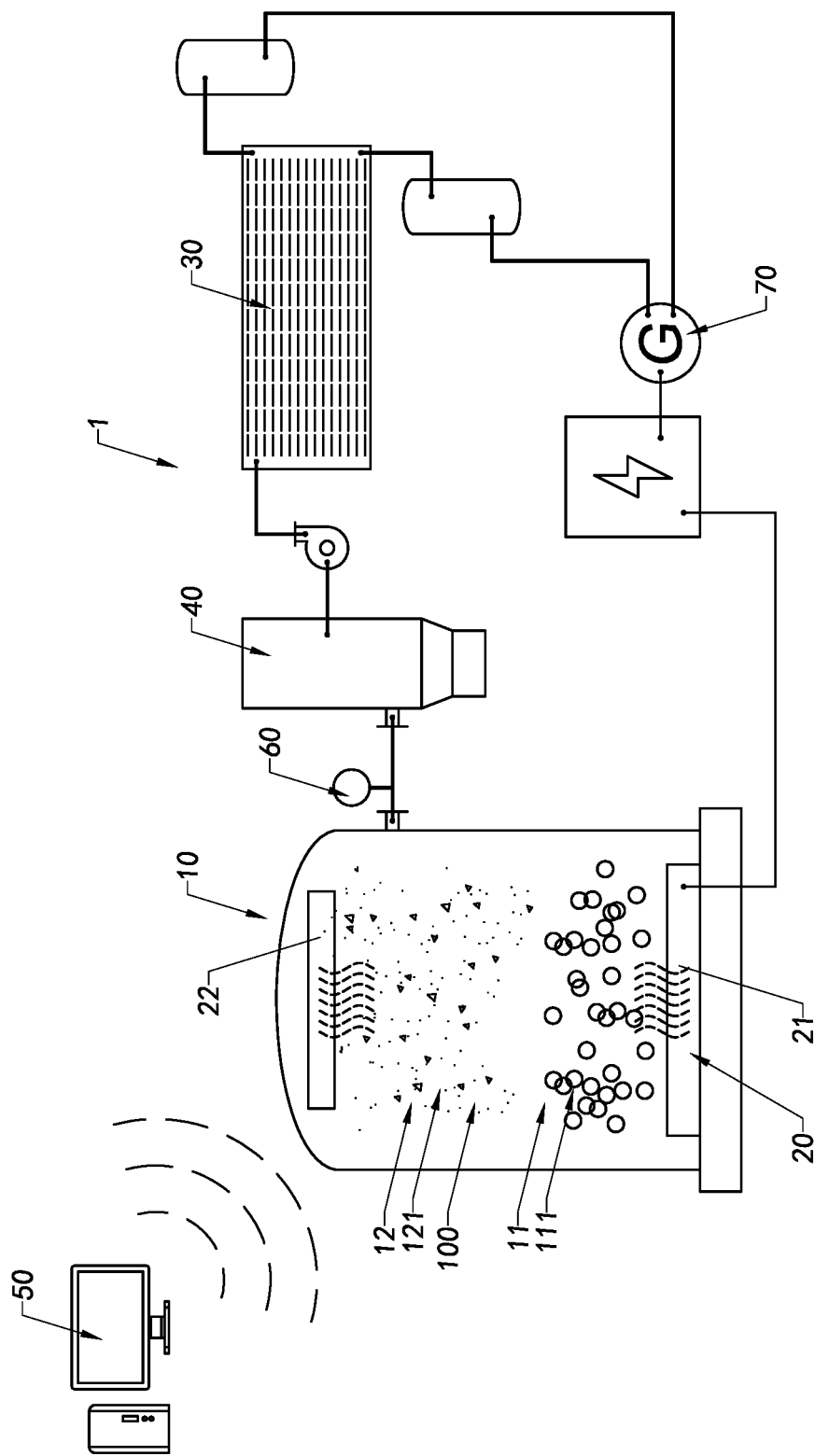
FIG. 2 is a schematic view of the plastic recycling system according to the above preferred embodiment of the present invention.

Referring to FIG. 1 and FIG. 2, the plastic recycling system 1 according to a preferred embodiment of the present invention is illustrated.

The plastic recycling system 1 comprises a reaction unit 10, a heating unit 20 and a condensation unit 30. The reaction unit 10 is configured for processing decomposition such as pyrolysis of plastic products and the heating unit 20 is arranged operatively to provide heat energy to the reaction unit 10 or to provide heat around the reaction unit 10. The condensation unit 30 is operatively connected with the reaction unit 10.

The reaction unit 10 has a sealable reaction chamber 100 therein. When one or more plastic products are disposed in the reaction chamber 100 of the reaction unit 10, the heating unit 20 which is arranged for providing heat energy to the reaction unit 10 is actuated to provide adequate heat energy in the reaction chamber 100 of the reaction unit 10 to melt the plastic products so as to convert the plastic products from solid state to melted liquid state. The melted plastic products will be gasified and decomposed to gas phase decomposed product through pyrolysis under the continuous supply of heat within the reaction chamber 100 of the reaction unit 10, wherein the gas phase decomposed products include useable fuel product. When the gas phase decomposed products pass through the condensation unit 30, at least a portion of the gas phase decomposed products will be condensed to obtain a liquid phase decomposed product, wherein at least a portion of the fuel product is condensed to form at least a portion of the liquid phase decomposed product.

The reaction unit 10 provides a gasification environment and a decomposition environment for the plastic products. In the gasification environment, the solid state plastic products are melted to melted state plastic product which will be gasified. In the decomposition environment, the melted state plastic product is gasified to gas phase plastic product to be pyrolyzed to form a decomposed product. The heating unit 20 is configured to provide a predetermined amount of heat energy to the reaction unit 10 for forming the desired gasification environment and the desired decomposition environment.

The heating unit 20 is configured to be a device that is able to provide heat energy from electrical energy, wherein the electrical energy supplied to the heating unit 20 is converted into heat supplying to the reaction unit 10.

The heating unit 20 is an electrical heating unit that can be conveniently and precisely control its output power and energy. For example, the power output of the heating unit 20 for supplying heat to the reaction unit 10 can be precisely controlled to ensure the responsive temperature of the reaction unit 10 can be precisely controlled too.

Furthermore, the heating unit 20 can steadily supply heat to the reaction unit 10 without the concern of the heat energy supply of the heating unit 20 to the reaction unit 10 being adversely affect the external condition and environment. In other words, the heat energy supply of the heat unit 20 to the reaction unit 10 is difficult to be influenced by the outside condition and environment. In contrary, if the heat supply is conducted by the conventional combustion method, wherein oxygen in air is required and consumed to complete the combustion with fuel. It is well known that the air content and concentration of oxygen in air are not constant factors that can be affected by various conditions and factors, such as the direction and speed of wind, so that it is so difficult to control the amount of heat to be produced with respect to the fuel consumption. In addition, fuel has to be continuously supplemented when the fuel is exhausted so as to maintain the temperature of the reaction unit 10 at the predetermined temperature for pyrolysis reaction. According to the present invention, constant, steady and controllable heat can be supplied by electrical power that can be supplied more steadily while the electrical power supply and the heat energy supply are both measurable and controllable.

The heating unit 20 of the present invention is able to be arranged and equipped with the reaction unit 10 to provide heat energy at predetermined portion and position of the reaction unit 10 in a predetermined manner. In contrary, if the heat to the reaction unit 10 is supplied by the conventional fuel combustion manner, the fuel has to be combusted outside the reaction unit 10 that the amount and manner of heat produced would be relatively influenced by the quality, concentration and flow of air around the reaction unit, so that the exact position of the reaction unit 10 to be heated with predetermined thermal energy during the fuel combustion is difficult to be controlled and maintained. In addition, according to the nature of fuel combustion, the flame and heat are provided and flow upwardly, so that the fuel combustion should generally be arranged at the bottom portion of the reaction unit 10 to enable the heat energy being conducted from the bottom to the top of the reaction unit 10 more efficiently. According to the preferred embodiment of the present invention, the heating unit 20 is not limited to be arranged at any preferred or designated position or direction of the reaction unit 10, but is able to be arranged and equipped at desired heating position and portion according to the overall design and actual requirement of the reaction unit 10. For example, the heating unit 20 can be arranged at a lower portion of the reaction unit 10, an upper portion of the reaction unit 10, or a middle portion of the reaction unit 10. In fact, alternatively and theoretically speaking, the heating unit 20 can be arranged at any desired position or portion of the reaction unit 10 for producing heat to the desired portion and position of the reaction unit 10.

According to the preferred embodiment of the present invention, the heating unit 20 is embodied as electrical heating unit 20 to produce heat through electric heating wires, electro-thermal tube, electric heater, electromagnetic heater, electric induction device, and etc., for example, which would be installed at the outer wall outside the reaction unit 10 or within the wall of the reaction unit 10. For example, the wall of the reaction unit 10 may be comprised of an inner layer and an outer layer while the heating unit 20 is sandwiched between the outer layer and the inner layer of the reaction unit 10, wherein insulation layer can further be provided between the heating unit 20 and the outer layer to ensure the heat energy produced by the heating unit 20 is conducted to the inner layer and transferred into the reaction chamber 100 of the reaction unit 10.

It is worth mentioning that, since the heat energy produced from the heating unit 20 is transferred to the interior of the reaction unit 10 through the wall thereof, the conventional fuel combustion outside the reaction unit 10 would have much thermal energy loss. However, the heating unit 20 according to the preferred embodiment of the present invention is not limited to be arranged outside the reaction unit 10, wherein the heating unit 20 is able to be arranged inside the reaction unit 10 or within the wall of the reaction unit 10 to ensure better heat conduction and reduce the possible loss of thermal energy.

Furthermore, oxygen is required to complete fuel combustion. Therefore, oxygen in air would gather around the reaction unit 10 during the fuel combustion and reaction process of the reaction unit 10, and that exhaust gases, such as carbon dioxide, sulfur dioxide, and etc., depending on the type of fuel being used, are generated during the fuel combustion. According to the present invention, the power supply for the heating unit 20 is electricity, so that no oxygen is required for reaction and thus the heat supply of the present invention does not depend on oxygen in air and no exhaust gas will be generated. Therefore, the plastic recycling system 1 of the present invention can be applied and operated in wider scope, such as to be used in district and area with thinner oxygen content in the air. In view of environmental protection, the recycling process of the plastic recycling system 1 of the present invention consumes clean energy, i.e. electric energy, that minimizes the influence to the environment in comparison to the conventional fuel combustion type pyrolysis process.

It is appreciated that the heating means of the heating unit 20 may include, but not limited to, resistance heater, induction heater, electric arc heating, infra-red heating, and/or dielectric heating, etc., which transfers electrical energy into thermal energy.

The heating unit 20 is equipped with the reaction unit 10, such that the heating unit 20 can be mounted on the outer wall of the reaction unit 10 or the inner wall of the reaction unit 10. Or, alternatively, the heating unit 20 can be arranged around the reaction unit 10 or inside the reaction unit 10.

It is worth mentioning that since the conventional fuel combustion during traditional plastic recycling process causes oxygen gathering around the reaction unit 10, the reaction unit 10 must be constructed with more sturdy structure and better tightness sealingly to absolutely isolate the plastic products contained in the reaction unit 10 from the outside oxygen gathered around the reaction unit 10 during the pyrolysis process through fuel combustion, in order to avoid deflagration or even explosion caused by the contact of the decomposed product inside the reaction unit 10 with the oxygen outside the reaction unit 10.

According to the plastic recycling system 1 of the present invention, the heating unit 20 does not require oxygen supply, so that it does not need any oxygen presented around the reaction unit 10 and thus the tightness and sealing requirements of the reaction unit 10 of the present invention do not need to meet the standard of the conventional reaction unit for traditional fuel combustion method. For example, the reaction unit 10 can be arranged in an atmosphere of an inert gas, wherein the inert gas will not react with the plastic product or the side product thereof. Also, in case there is any slightly leakage of the plastic product or the side product thereof in the reaction unit 10 into an inert gas environment, it will not cause excessive impact and adverse influence.

According to the preferred embodiment of the present invention, the plastic recycling system 1 further comprises a filtration unit 40 adapted for filtering the decomposed products generated in the reaction unit 10 to remove impurities.

The plastic recycling system 1 is adapted to recycle multiple types of plastic, such as PETE, HDPE, PVC, LDPE, PP, or PS, and other types of plastic, wherein these plastics can be decomposed into short carbon chains for producing useful fuel products. After the decomposition reaction processed in the reaction unit 10, the plastic products are decomposed to form one or more decomposed products which are transferred to the condensation unit 30 after being filtered by the filtration unit 40. The filtration unit 40 is configured to filter at least some impurities in the decomposed products to ensure the purity of the final product. For example, the PETE plastic material would be decomposed into PE and TE after the decomposition process, such as pyrolysis, in the reaction unit 10, where TE can be filtered by the filtration unit 40 to produce a final product of PE. For example, HCl will be generated during the decomposition process of PVC plastic product which can be filtered by the filtration unit 40.

The filtration unit 40 may comprise a physical filtration module 41 and a chemical filtration module 42, wherein the physical filtration module 41 filters impurities by physical impurities, such as TE (terephthalate), and the chemical filtration module 42 filters chemical impurities, such as neutralizing HCl with an alkali base. The physical filtration module 41 and the chemical filtration module 42 are linked between the reaction unit 10 and the condensation unit 30. Either the physical filtration module 41 or the chemical filtration module 42 could be arranged adjacent to reaction unit 10, so that the decomposed products can be delivered to the physical filtration module 41 and then the chemical filtration module 42 or to the chemical filtration module 42 and then the physical filtration module 41 for filtration of physical and chemical impurities before feeding into the condensation unit 30. According to the preferred embodiment, the filtration unit 40 is arranged between the reaction unit 10 and the condensation unit 30, and the one or more decomposed products are transferred from the reaction unit 10 to the filtering unit 40 for filtration, and then passed through the condensation unit 30 for condensation to obtain the final liquid phase fuel product.

In an alternative embodiment of the present invention, the chemical filtration module 42 and the physical filtration module 41 of the filtration unit 40 may also be disposed in the reaction unit 10 so that the decomposed products can be filtered before transferring out of the reaction unit 10 to the condensation unit 30.

Alternatively, one of the chemical filtration module 42 and the physical filtration module 41 of the filtering unit 40 may be disposed in the reaction unit 10 while the other is arranged between the reaction unit 10 and the condensation unit 30. For example, the physical filtration module 41 is disposed in the reaction unit 10, and the chemical filtration module 42 is arranged between the reaction unit 10 and the condensation unit 30.

Figure 3:
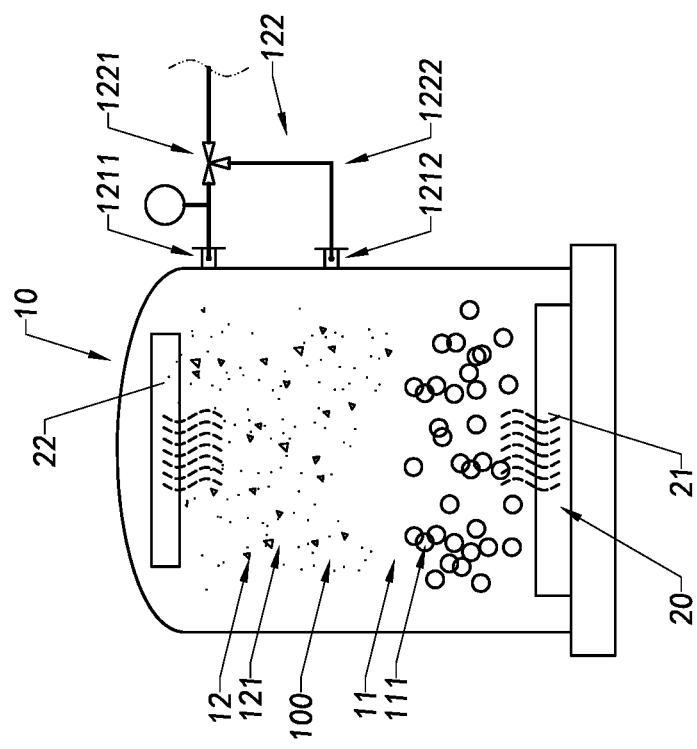
FIG. 3 is a schematic view illustrating the decomposition module of the plastic recycling system according to the above preferred embodiment of the present invention.

Furthermore, according to the preferred embodiment of the present invention, the reaction unit 10 comprises a gasification module 11 having a gasification chamber 111 therein and a decomposition module 12 having a decomposing reaction chamber 121 therein, wherein the gasification module 11 is configured for gasifying solid state plastic products contained in its gasification chamber 111, and the decomposition module 12 is configured for decomposing the gaseous products contained in its decomposing reaction chamber 121. The gasification module 11 and the decomposition module 12 are communicatedly connected with each other so that the gasification chamber 111 and the decomposing reaction chamber 121 are combined to form the reaction chamber 100, as shown in FIG. 3.

Figure 4:
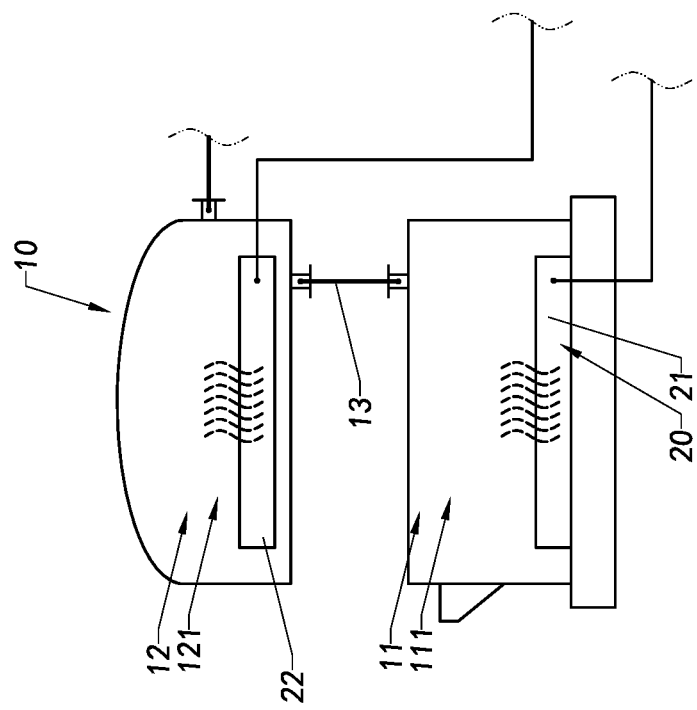
FIG. 4 is a schematic view illustrating the reaction unit of the plastic recycling system according to an alternative mode of the above preferred embodiment of the present invention.

In one embodiment, as shown in FIG. 4, the gasification module 11 and the decomposition module 12 are two independent reaction bodies communicatively connected with each other, so that the solid phase plastic products contained in the gasification module 11 can be gasified in the gasification chamber 111 thereof to form the gaseous product and then the gaseous products can be transferred to the decomposing reaction chamber 121 of the decomposition module 12 and be decomposed therein to form the decomposed products. Alternatively the reaction unit 10 is implemented as a container having a lower space chamber and an upper space chamber, wherein the gasification module 11 and the decomposition module 12 are integrated such that the lower space chamber functions as the gasification chamber 111 and the upper space chamber functions as the decomposing reaction chamber 121.

The heating unit 20 is arranged to supply heat to both the gasification module 11 and the decomposition module 12 of the reaction unit 10. It is appreciated that the gasification module 11 and the decomposition module 12 can be heated together by the heating unit 20. For example, the heating unit 20 is arranged at the decomposition module 12 while the gasification module 11 is preferred to be configured above the decomposition module 12, such that the heat supplied by the heating unit 20 to the gasification module 11 would be transferred to the decomposition module 12 through the gasification module 11.

In the preferred embodiment of the present invention, the heating unit 20 is configured to supply heat toward the gasification module 11 and the decomposition module 12 respectively. Specifically, the heating unit 20 comprises a gasification heating module 21 and a decomposition heating module 22, wherein the gasification heating module 21 is operatively arranged at the gasification module 11 for supplying thermal energy to heat the gasification module 11, and the decomposition heating module 22 is operatively arranged at the decomposition module 12 for supplying thermal energy to heat the decomposition module 12.

It would be understood that there are various manners of the arrangement of the gasification heating module 21 at the gasification module 11. For example, the gasification heating module 21 can be arranged around the gasification module 11 or inside the gasification module 11. The heating energy supply of the gasification heating module 21 may be, but is not limited to, by resistance heating, induction heating, arc heating, infrared heating, dielectric heating, or etc. Similarly, there are also various manners of the arrangement of the decomposition heating module 22 at the decomposition module 12. For example, the decomposition heating module 22 can be arranged around the decomposition module 12 or inside the decomposition module 12. The heating energy supply of the decomposition heating module 22 may be, but is not limited to, by resistance heating, induction heating, arc heating, infrared heating, dielectric heating, or etc.

It is worth mentioning that because the pyrolysis reaction of plastic products is complicated that the major change of the plastic products in the gasification module 11 is being gasified to a gaseous state, wherein decomposition reaction, such as pyrolysis reaction may also occur in the gasification module 11 that some of the gaseous products may be decomposed, such as pyrolyzed, to decomposed products in the gasification module 11 too.

In the preferred embodiment, the gasification heating module 21 of the heating unit 20 is arranged at a lower portion of the reaction unit 10, and the decomposition heating module 22 is arranged at an upper portion of the reaction unit 10. However, it would be understood that the positions of the gasification heating module 21 and the decomposition heating module 22 to be arranged with respect to the reaction unit 10 are not limited to the above embodied configuration. For example, the gasification heating module 21 may be arranged at the top, the bottom, or the periphery of the gasification heating module 21, and the decomposition heating module 22 may be arranged at the top, the bottom, or the periphery of the decomposition heating module 22. Of course, it can be understood that the gasification heating module 21 and the decomposition heating module 22 of the heating unit 20 may be set at the same position, for example, a bottom position of the reaction unit 10.

Further, the heating unit 20 is configured and equipped to heat the gasification module 11 of the reaction unit 10 to a predetermined temperature ranged from 380° C. to 440° C. in the gasification chamber 111 of the gasification module 11 to ensure the plastic product being gasified. According to at least one preferred embodiment of the present invention, the gasification module 11 of the reaction unit 10 is preferred to be heated to the predetermined temperature ranged from 425° C. to 435° C. inside the gasification module 11 by the heating unit 20.

The heating unit 20 is configured and equipped to heat the decomposition module 12 of the reaction unit 10 to a predetermined temperature ranged from 80° C. to 140° C. in the decomposing reaction chamber 121 of the decomposition module 12 to ensure the gaseous product being decomposed into one or more desired decomposed products through the decomposition reaction, such as pyrolysis reaction. According to at least one preferred embodiment of the present invention, the decomposition module 12 of the reaction unit 10 is preferred to be heated to the predetermined temperature ranged from 125° C. to 135° C. inside the decomposition module 12, or higher, by the heating unit 20.

It is worth mentioning that the temperature referred to the gasification module 11 or the decomposition module 12 is the temperature inside the gasification module 11 or the decomposition module 12, that is the gasification chamber 111 of the gasification module 11 and the decomposing reaction chamber 121 of the decomposition module 12. In other words, it is the environment temperature of the plastic products contained in the reaction unit 10.

It is appreciated that, according to the plastic recycling system 1 of the present invention, the pressure of the reaction unit 10 can be greatly reduced. In contrary, in the conventional fuel combustion recycling method, the entire reactor must be entirely sealed to avoid any contact with the air outside the reactor, and that the fuel combustion is needed to be set at the bottom end of the reactor to heat the reactor until the heat rises to the lower space of the reactor to a temperature about 400° C. to gasify the plastic products therein. In order to pyrolyze the gasified plastic product contained in the reactor, the fuel combustion is required to be continuously heated to ensure the gasified plastic product rising to the upper space of the reactor where is maintained at a predetermined temperature. The gasified plastic product needs to stay in the reaction unit 10 for a longer period of time to absorb enough heat until it is decomposed into the desired decomposed product through pyrolysis reaction. Therefore, the pressure in the reactor is maintained at a high level throughout the entire process, wherein the entire reactor that is in a high-temperature and high-pressure state remains in a relatively risky and dangerous condition.

According to the plastic recycling system 1 of the preferred embodiment of the present invention, since the gasification module 11 and the decomposition module 12 of the reaction unit 10 can be separately and individually heated by, for example, the gasification heating module 21 and the decomposition heating module 22 of the heating unit 20 respectively, the gaseous products in the decomposition module 12 can be much easily and efficiently heated to the predetermined temperature to be decomposed into the one or more desired decomposed products. In other words, after the plastic products in the gasification module 11 are gasified to the one or more gaseous products and delivered to arrive in the decomposition module 12, the one or more gaseous products can be quickly and efficiently heated to the predetermined decomposing temperature to be decomposed to obtain the one or more decomposed products through the expected decomposition reaction, and then be transferred to the filtration unit 40 and/or the condensation unit 30 timely. Therefore, the pressure of the reaction unit 10, especially the decomposition module 22 thereof, does not require to be maintained at a high pressure state, so that the entire reaction unit 10 is in a high temperature and low pressure state that its danger is greatly reduce.

It is worth mentioning that, in this embodiment, the gasification module 11 and the decomposition module 12 of the reaction unit 10 are communicated and integrated with each other, such that the reaction unit 10 may be an integral unit.

According to an alternative mode of the preferred embodiment of the present invention, the gasification module 11 and the decomposition module 12 of the reaction unit 10 are two independent bodies while the gasification module 11 and the decomposition module 12 are communicated with each other by connecting with one or more passing channels 13 therebetween. When the gasification module 11 and the decomposition module 12 are independently configured, the reaction unit 10 may comprise one gasification module 11 connecting with two or more decomposition modules 12 through passing channels 13 or, alternatively, the reaction unit 10 may comprise a plurality of gasification modules 11 connecting with one decomposition module 12 through passing channels 13.

Further, as shown in FIG. 3, the decomposition module 12 is embodied to provide the decomposing reaction chamber 121, wherein the decomposition heating module 22 is arranged and configured to supply heat energy in the decomposing reaction chamber 121 for heating the gaseous products contained therein.

Correspondingly, the decomposition module 12 includes a circulation channel 122, which has a circulation outlet passage 1221 and a circulation inlet passage 1222, and that the decomposing reaction chamber 121 has a decomposition outlet 1211 and a decomposition inlet 1212, wherein the circulation outlet passage 1221 of the circulation channel 122 is operatively connected to the decomposition inlet 1212 of the decomposing reaction chamber 121, and the circulation inlet passage 1222 of the circulation channel 122 is operatively connected to the decomposition outlet 1211 of the decomposing reaction chamber 121.

When one or more gaseous products at the decomposition outlet 1211 of the decomposing reaction chamber 121 does not reach a predetermined temperature, the plastic recycling system 1 of the present invention is controlled that the circulation inlet passage 1222 of the circulation channel 122 is communicated with the decomposition outlet 1211, and the circulation outlet passage 1221 is communicated with the decomposition inlet 1212, such that the one or more gaseous products which have not reached the predetermined temperature enter the circulation channel 122 and are transferred back to the decomposing reaction chamber 121 for further decomposition reaction. The decomposition heating unit 20 of the heating unit 20 may be embodied to be disposed in the decomposing reaction chamber 121 to provide heat energy in the decomposing reaction chamber 121, or may also be disposed in the circulation channel 122 to provide heat energy in the circulation channel 122.

Moreover, the plastic recycling system 1 according to the preferred embodiment of the present invention further comprises a control unit 50, wherein the reaction unit 10, the heating unit 20, and the condensation unit 30 are controllably connected to the control unit 50. The control unit 50 is equipped to control the temperature, pressure, and reaction time of the reaction unit 10. The control unit 50 is also configured to control the working power and heating time of the heating unit 20. The control unit 50 is configured to control the operation of the condensation unit 30.

Furthermore, the plastic recycling system 1 includes a monitor unit 60, wherein the monitor unit 60 is communicably connected to the control unit 50. Also, the monitor unit 60 is configured to monitor a reaction state of the reaction unit 10, including at least its reaction temperature and its reaction pressure. The control unit 50 controls the reaction unit 10 based on the data monitored by the monitor unit 60. For example, the predetermined temperature of the gasification module 11 of the reaction unit 10 is 420° C., and that if the monitoring unit 60 monitored that the temperature in the gasification module 11 is 425° C., then the control unit 50 controls the heating unit 20 to reduce the working power of the heating unit 20 to supply less heat energy in the gasification module 11 so that the gasification chamber 111 of the gasification module 11 of the reaction unit 10 can be maintained at 420° C., and that if the monitoring unit 60 monitored that the temperature in the gasification module 11 is 415° C., then the control unit 50 controls the heating unit 20 to increase the working power of the heating unit 20 to supply more heat energy in the gasification module 11 so that the gasification chamber 111 of the gasification module 11 of the reaction unit 10 can be maintained at 420° C.

It is worth mentioning that, since the heating unit 20 is an electric-based heating device, the control unit 50 can control the working power of heating unit 20 remotely. The entire plastic recycling system 1 can be remotely monitored and controlled. The control unit 50 can automatically control the plastic recycling system 1 or control the plastic recycling system 1 according to the instructions of the user.

According to the preferred embodiment of the present invention, the condensation unit 30 provides a condensation medium to take away the heat of the one or more gaseous decomposed products, so that the one or more gaseous decomposed products are condensed to obtain a liquid phase product, including but not limited to usable fuel product. The condensation medium may be a gas, a liquid, a solid, or a mixture thereof. According the preferred embodiment of the present invention, the condensation medium is air. The condensation medium of the condensation unit 30 is at a preset temperature, and then the gaseous decomposed products from the decomposition module 12 of the reaction unit 10 are condensed to liquid phase. By controlling the temperature of the condensation medium, a desired condensation product can be obtained According to the preferred embodiment, a predetermined temperature of the condensation medium of the condensation unit 30 is controlled to be ranged from 20° C. to 40° C. In at least one embodiment of the present invention, the temperature of the condensation medium may be controlled between 25° C. to 30° C. preferably.

It is worth mentioning that the condensation unit 30 can be implemented to include a plurality of pipes exposed to the ambient air while configuring to have contact areas with air as much as possible, so as to achieve the condensation of the gaseous decomposed products passing therethrough with the flowing air at room temperature.

According to the preferred embodiment, the liquid fuel products obtained through condensation by the condensation unit 30 include at least a higher content of octane, which can be used as useable fuel.

At least some of the gaseous decomposed products from the decomposition module 12 of the reaction unit 10 may not be condensed and recovered, such as methane, which will remain in a gaseous state. Accordingly, the methane may be used to power or transferred to an electric power generation unit 70, wherein the non-condensable gas can be converted into electrical energy. Some of the liquid phase usable fuel products recycled by the condensation unit 30 can also be transferred to the power generating unit 70 to be converted into electrical energy for supplying to the heating unit 20 of the plastic recycling system 1 of the present invention or other power-consuming equipments.

Referring to FIG. 4, the plastic recycling system 1 according to an alternative mode of the preferred embodiment of the present invention is illustrated, wherein the gasification module 11 and the decomposition module 12 of the reaction unit 10 of the plastic recovery system 1 are independently configured and arranged.

The gasification module 11 is operatively connected to the decomposition module 12, wherein the gasification module 11 and the decomposition module 12 may be disposed with a certain distance therebetween, while they can be connected with each other through at least one passing channel 13.

The gasification heating module 21 and the decomposition heating module 22 of the heating unit 20 are independently configured and arranged in such a manner that the gasification heating module 21 is arranged for heating the gasification module 11 and the decomposition heating module 22 is arranged for heating the decomposition module 12.

Accordingly, the gasification heating module 21 and the decomposition heating module 22 are independent with each other and can be controlled independently by the control unit 50.

It is worth mentioning that the gasification module 11 and the decomposition module 12 can be independently set according to their respective requirements. In contrary, in the conventional method of recycling plastic by fuel combustion, a cylindrical reaction container is generally used as the reactor so that heat can perform convection. According to the preferred embodiment of the present invention, since the heating unit 20 can be equipped to provide different amount of heat energy at different positions of the reaction unit 10 in a predetermined and controllable manner, the gasification module 11 and the decomposition module 12 of the reaction unit 10 may then be arranged independently, so the gasification module 11 may not be limited to a traditional cylinder or a cylindrical shape, and may be designed to be wider and shallower, such as circular shape, to facilitate the emission and overflowing of gas.

Figure 5:
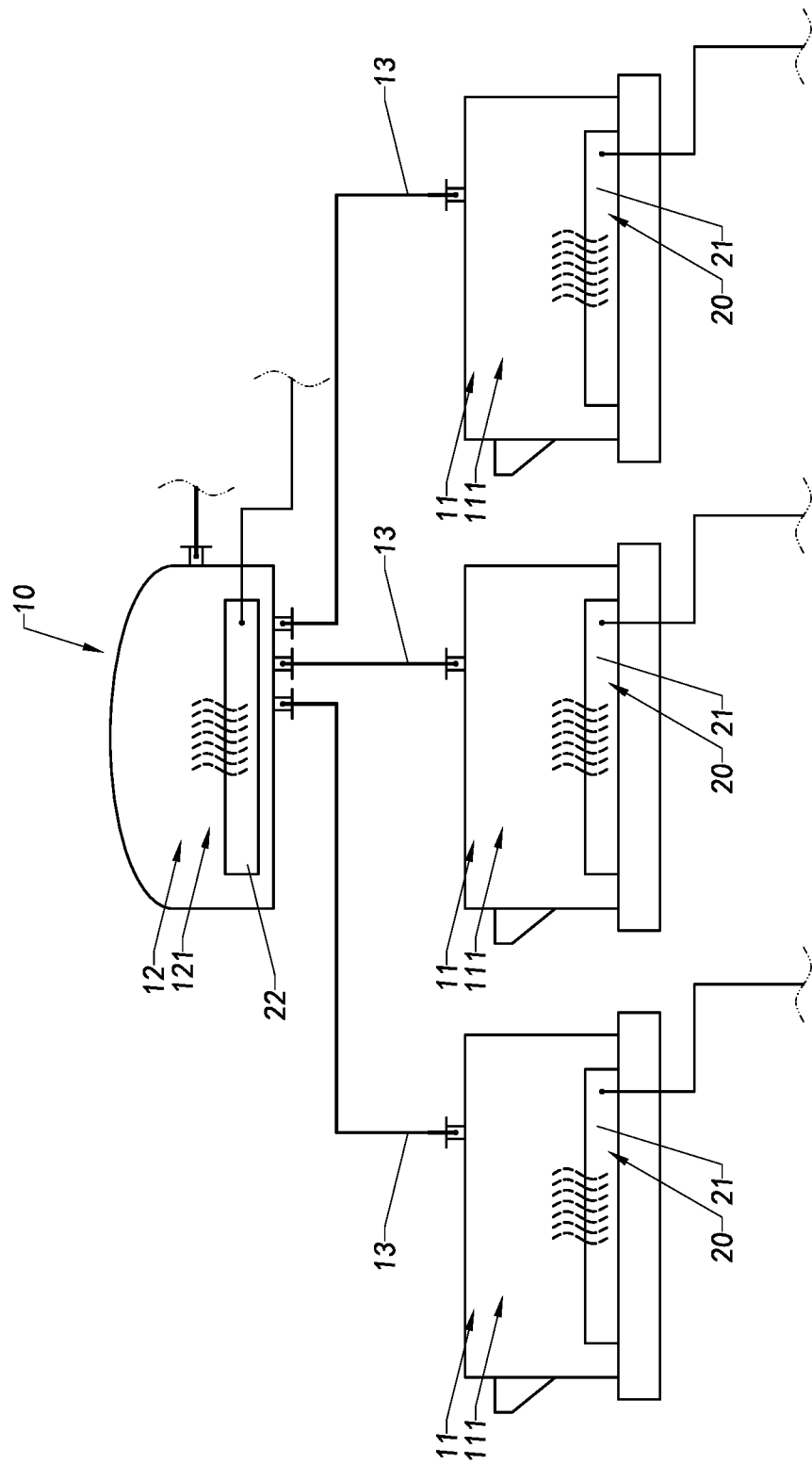
FIG. 5 is a schematic view illustrating the reaction unit of the plastic recycling system according to another alternative mode of the above preferred embodiment of the present invention.

Referring to FIG. 5, the plastic recycling system 1 according to another alternative mode of the preferred embodiment of the present invention is illustrated, wherein the reaction unit 10 of the plastic recovery system 1 comprises at least one decomposition module 12 and a plurality of the gasification modules 11 operatively connected to the decomposition module 12, and the heating unit 20 also comprise a plurality of gasification heating modules arranged for the gasification modules 11 respectively for supplying heat energy to the gasification modules respectively in controllable manner. Alternatively, the heating unit 20 may also be configured and equipped to supply desired heat energy to each of the decomposition module 11 and the gasification modules 12.

The decomposition module 12 and each of the gasification modules 11 are connected through a corresponding passing channel 13 so that the decomposition module 12 and each of the gasification modules 11 can be designed to have a desired distance therebetween.

According to the alternative mode of the preferred embodiment, the gasification modules 11 can be designed in smaller size for facilitation of gasification as well as heat energy supply and control. In contrary, in view of the conventional fuel combustion method, the reactor container is required to be maintained in a high temperature and high pressure state in order to perform the relatively high difficulty of the pyrolysis reaction. Therefore, it is preferred to process plastic products as much as possible at one time, wherein a larger size of the reactor container is preferred to process more plastic products in one pyrolysis reaction cycle, and thus longer processing time is required for each pyrolysis reaction cycle accordingly. According to the plastic recycling system 1 of this alternative mode of the preferred embodiment of the present invention, the reaction unit 10 does not need to be process in the high-temperature and high-pressure state as in the conventional fuel combustion method that substantially facilitates the operation and shortens the processing time. Each of the gasification modules 11 of the reaction unit 10 can process a small amount of plastic products can be put into the reaction unit 10, wherein larger amount of plastic products can be processed at a time with more gasification modules 11, while the gaseous products produced by each of the gasification modules 11 can be transferred to the same decomposition module 12 through the passing channels 13 for decomposition reaction therein. In addition, the smaller size gasification module is also suitable for portable use.

According to another aspect of the present invention, the present invention provides a plastic recycling method, which includes the following steps:

(a) Generate one or more gaseous fuel products, such as combustible gas, by thermal decomposing plastic products through a thermal decomposition reaction process, such as pyrolysis reaction process, in a reaction unit 10 heated by a heating unit 20 using electric energy.

(b) Condense at least a portion of the gaseous fuel products to liquid phase useable fuel.

In the decomposing step (a), the plastic products are pyrolyzed (mainly in an environment lacking of oxygen and nitrogen) without the participation of air, wherein the solid state plastic products are melted by heat energy provided by the heating unit 20 and the melted plastic products is further heated and gasified into gaseous state by the heating unit 20 to form gaseous products having smaller molecules. In other words, the plastic products can be melted from a solid state and then gasified to a gaseous state, or be directly gasified from a liquid state.

In the decomposing step (a), the plastic products can be disposed in the integral reaction unit 10. The lower portion of the reaction unit 10 is the gasification module 11 and the upper portion of the reaction unit 10 is the decomposition module 12. The plastic products are heated in the gasification chamber 111 of the gasification module 11, i.e. the lower space portion of the reaction unit 10 until the solid phase plastic products are melted and gasified to form one or more gaseous products rising up to the decomposing reaction chamber 121 of the decomposition module 12, i.e. the upper space portion of the reaction unit 10 which are further heated for pyrolysis reaction to form one or more gaseous fuel products to emit from the reaction unit 10 to the condensation unit 30 to process the condensing step (b).

In the decomposing step (a), the heating unit 20 could be arranged at the lower portion of the reaction unit 10 to heat the reaction unit 10.

In the condensing step (b), the liquid phase fuel products can be collected from the condensation unit 30 for future usage as a fuel. Uncondensed gaseous products remained in the condensation unit 30 may also be collected for usage as a gaseous fuel. Both of the above liquid phase and gas phase products can be recycled to the electric power generation unit 70 for electric power generation.

The plastic recycling method further comprises at step of filtering impurities in the gaseous products from the reaction unit 10, wherein the gaseous products may be filtered by chemical or physical means. For example, the chemical filtration module 42 is used to filter HCl in gaseous products by means of chemical absorption, and the physical filtration module 41 is used to filter TE (terephthalate). The chemical filtration module 42 may filter HCl at the position of the reaction unit 10, and may also filter HCl in the gaseous products transmitting between the reaction unit 10 and the condensation unit 30. The physical filtering module 41 may perform a filtering function at the position of the reaction unit 10, or may be disposed between the reaction unit 10 and the condensation unit 30 to filter impurities in the gaseous products.

Further, in the decomposing step (a), the decomposition module 12 of the reaction unit 10 is controlled at a predetermined temperature, for example, 80° C. to 120° C. The gaseous products gasified in the gasification module 11 is transferred to the decomposing reaction chamber 121 of the decomposition module 12. When the temperature of the gaseous products leaving the decomposing reaction chamber 121 does not reach the predetermined temperature, the decomposition outlet 1211 of the decomposing reaction chamber 121 is communicated with the circulation inlet passage 1222 of the circulation channel 122 so that the gaseous products that has not reached the predetermined temperature is continuously heated for completion of the pyrolysis reaction. The gaseous products that has not reached the predetermined temperature may be reheated in the decomposing reaction chamber 121 of the decomposition module 12, or may be reheated in the circulation channel 122. The gaseous products returns to the decomposing reaction chamber 121 through the circulation outlet passage 1221 of the circulation channel 122, and then is transferred to the condensation unit 30 after passing through the decomposing reaction chamber 121.

Further, in the decomposing step (a), the ambient temperatures of the gasification module 11 and the decomposition module 12 of the reaction unit 10 are controlled independently, such that the heating of the decomposition module 12 does not depend on the heating of the gasification module 11.

Further, a catalyst may be added to the reaction unit 10 to accelerate the reaction speed.

Those skilled in the art should understand that the embodiments of the present invention shown in the above description and the accompanying drawings are merely examples and do not limit the present invention. The object of the invention has been completely and effectively achieved. The function and structural principle of the present invention have been shown and explained in the embodiments, and the embodiments of the present invention may have any deformation or modification without departing from the principle.

What is claimed is:

1. A plastic recycling system for recycling one or more plastic products, comprising:

a reaction unit having a reaction chamber which is sealable from outside and adapted for containing the one or more plastic products for recycling therein, wherein said reaction chamber has a decomposing reaction chamber and a gasification chamber arranged to communicate with said decomposing reaction chamber and configured for containing the one or more plastic products, selected from the group consisting of PETE $(C_{10}H_8O_4)_n$, HDPE $(C_2H_4)_n$, PVC $(C_2H_4Cl)_n$), LDPE $((C_2H_4)_n$, PP $(C_3H_6)_n$, and PS $(C_8H_8)_n$, wherein said reaction unit has a circulation channel which has a circulation outlet passage and a circulation inlet passage, and said decomposing reaction chamber has a decomposition outlet and a decomposition inlet, wherein said circulation outlet passage of said circulation channel is operatively connected to said decomposition inlet of said decomposing reaction chamber, and said circulation inlet passage of said circulation channel is operatively connected to said decomposition outlet of said decomposing reaction chamber; and an electric heating unit which is arranged and configured to convert electric energy to thermal energy to heat said reaction unit, wherein said electric heating unit is arranged to heat said gasification chamber to a first predetermined temperature ranged from 380° C. to 440° C. such that the one or more plastic products is melted and gasified to form one or more gaseous products transferring to said decomposing reaction chamber, wherein said electric heating unit is arranged to heat said decomposing reaction chamber to a second predetermined temperature ranged from 80° C. to 140° C. such that the one or more gaseous products are decomposed through a decomposition reaction to form one or more decomposed products to be collected from said decomposing reaction chamber, wherein the one or more decomposed products include at least a usable fuel in gas phase selected from the group consisting of dioxin $(C_4H_4O_2)$, benzene $(C_6H_6)$, octane $(C_8H_{18})$, methane $(CH_4)$, ethane $(C_2H_6)$, propane $(C_3H_8)$, and butane $(C_4H_{10})$, wherein when the one or more gaseous products at said decomposition outlet of said decomposing reaction chamber has a temperature below said second predetermined temperature, said circulation inlet passage of said circulation channel is controlled to communicate with said decomposition outlet, and said circulation outlet passage is controlled to communicate with said decomposition inlet so that the one or more gaseous products having a temperature below said second predetermined temperature are transferred back to said decomposing reaction chamber for further processing said decomposition reaction.

2. The plastic recycling system, as recited in claim 1, wherein said reaction unit comprises a gasification module and a decomposition module which are independently arranged, wherein said gasification chamber is provided in said gasification module and said decomposing reaction chamber is provided in said decomposition module, wherein a passing channel is provided to communicate said gasification module with said decomposition module for transferring the gasified products from said gasification chamber of said gasification module to said decomposing reaction chamber of said decomposition module.

3. The plastic recycling system, as recited in claim 2, wherein said heating unit comprises a gasification heating module and a decomposition heating module, wherein said gasification heating module is arranged at said gasification module and configured to heat said gasification chamber to said first predetermined temperature and said decomposition heating module is arranged at said decomposition module and configured to heat said decomposing reaction chamber to said second predetermined temperature.

4. The plastic recycling system, as recited in claim 1, wherein said reaction unit is an integral container and said reaction chamber thereof has a lower space portion as said gasification chamber and an upper space portion as said decomposing reaction chamber, wherein said heating unit comprises a gasification heating module and a decomposition heating module, wherein said gasification heating module is arranged at a lower portion of said reaction unit to heat said gasification chamber to said first predetermined temperature and said decomposition heating module is arranged at an upper portion of said reaction unit to heat said decomposing reaction chamber to said second predetermined temperature.

5. The plastic recycling system, as recited in claim 1, wherein said reaction unit is an integral container and said reaction chamber thereof has a lower space portion as said gasification chamber and an upper space portion as said decomposing reaction chamber.

6. The plastic recycling system, as recited in claim 1, further comprising a condensation unit operatively connected to said reaction unit and configured for collecting the one or more decomposed products transferred from said reaction unit for converting the one or more decomposed products in gas phase to liquid phase.

7. The plastic recycling system, as recited in claim 2, further comprising a condensation unit operatively connected to said reaction unit and configured for collecting the one or more decomposed products transferred from said reaction unit for converting the one or more decomposed products in gas phase to liquid phase.

8. The plastic recycling system, as recited in claim 3, further comprising a condensation unit operatively connected to said reaction unit and configured for collecting the one or more decomposed products transferred from said reaction unit for converting the one or more decomposed products in gas phase to liquid phase.

9. The plastic recycling system, as recited in claim 4, further comprising a condensation unit operatively connected to said reaction unit and configured for collecting the one or more decomposed products transferred from said reaction unit for converting the one or more decomposed products in gas phase to liquid phase.

10. The plastic recycling system, as recited in claim 6, further comprising a filtration unit operatively connected between said reaction unit and said condensation unit and arranged for filtering one or more impurities in the one or more decomposed products collected from said reaction unit.

11. The plastic recycling system, as recited in claim 7, further comprising a filtration unit operatively connected between said reaction unit and said condensation unit and arranged for filtering one or more impurities in the one or more decomposed products collected from said reaction unit.

12. The plastic recycling system, as recited in claim 8, further comprising a filtration unit operatively connected between said reaction unit and said condensation unit and arranged for filtering one or more impurities in the one or more decomposed products collected from said reaction unit.

13. The plastic recycling system, as recited in claim 9, further comprising a filtration unit operatively connected between said reaction unit and said condensation unit and arranged for filtering one or more impurities in the one or more decomposed products collected from said reaction unit.

* * * * *